US012268254B2

(12) United States Patent
Kuroki

(10) Patent No.: US 12,268,254 B2
(45) Date of Patent: Apr. 8, 2025

(54) RADAR REFLECTOR, PROTECTOR AND WEAR

(71) Applicant: HONDA MOTOR CO., LTD., Tokyo (JP)

(72) Inventor: Kazuyoshi Kuroki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 17/693,458

(22) Filed: Mar. 14, 2022

(65) Prior Publication Data

US 2022/0304400 A1 Sep. 29, 2022

(30) Foreign Application Priority Data

Mar. 26, 2021 (JP) ................................ 2021-053650

(51) Int. Cl.
*A41D 13/01* (2006.01)
*H01Q 1/27* (2006.01)
*H01Q 15/14* (2006.01)

(52) U.S. Cl.
CPC ............ *A41D 13/01* (2013.01); *H01Q 1/273* (2013.01); *H01Q 15/147* (2013.01)

(58) Field of Classification Search
CPC ...... A41D 13/01; H01Q 1/273; H01Q 15/147; H01Q 15/18
See application file for complete search history.

(56) References Cited

U.S. PATENT DOCUMENTS

2013/0300594 A1* 11/2013 Rard ...................... H01Q 15/18 342/7
2018/0000184 A1* 1/2018 Jang ................... F21V 33/0008
2019/0183190 A1* 6/2019 Loberti ................... A41B 9/06
2019/0225810 A1 7/2019 Kuzuu

FOREIGN PATENT DOCUMENTS

JP 2000-084138 3/2000
JP 2007-129420 5/2007
JP 2008-095236 4/2008
JP 2018-056106 4/2018
JP 2020-022122 2/2020

OTHER PUBLICATIONS

German Office Action for German Patent Application No. 102022105612.0 mailed May 17, 2023.
Japanese Office Action for Japanese Patent Application No. 2021-053650 mailed Jan. 17, 2023.
Japanese Notice of Allowance for Japanese Patent Application No. 2021-053650 mailed Jul. 11, 2023.

* cited by examiner

*Primary Examiner* — Timothy A Brainard
(74) *Attorney, Agent, or Firm* — Amin, Turocy & Watson, LLP

(57) ABSTRACT

A radar reflector includes: a board formed in a shape corresponding to an area of a body; and a reflecting layer provided on the board and configured to reflect a radar wave in an irradiation direction of the radar wave.

7 Claims, 6 Drawing Sheets

RADAR REFLECTOR, PROTECTOR AND WEAR

CROSS-REFERENCE TO RELATED APPLICATION

Priority is claimed on Japanese Patent Application No. 2021-053650, filed on Mar. 26, 2021, the contents of which are incorporated herein by reference.

BACKGROUND

Field of the Invention

The present invention relates to a radar reflector, a protector and wear.

Background

In recent years, the number of vehicles that provide driving assistance to drivers has been increasing. In driving assistance, research is being conducted on sensing technology in which radar waves are scanned with millimeter waves and an object outside a vehicle is recognized on the basis of waves reflected by the object. In such a sensing technology, a large object such as a 4-wheeled vehicle or an object formed of a metal reflects radar waves well and is easy to detect. However, a subject smaller than a 4-wheeled vehicle such as a 2-wheeled vehicle, a bicycle, a pedestrian, or the like does not reflect radar waves well and may not be as easy to detect.

For example, Japanese Unexamined Patent Application, First Publication No. 2000-84138 discloses a jacket worn by an occupant on an automated 2-wheeled vehicle.

A shock absorbing material configured to protect each area of an occupant's body is attached to the jacket. It is suggested that the shock absorbing material has, for example, a honeycomb structure and is formed of aluminum. According to the jacket, radar waves may be reflected in the driving assistance system.

SUMMARY

According to the technology disclosed in Japanese Unexamined Patent Application, First Publication No. 2000-84138, even when the honeycomb structure is irradiated with radar waves, reflectivity may be lower than the regular reflectivity at an irradiation angle of the radar waves.

An aspect of the present invention is directed to providing a radar reflector, a protector and wear that are capable of protecting a user's body and improving recognizability of in-vehicle radar of a vehicle having a driving assistance function.

A radar reflector according to a first aspect of the present invention includes: a board formed in a shape corresponding to an area of a body; and a reflecting layer provided on the board and configured to reflect a radar wave in an irradiation direction of the radar wave.

According to the first aspect of the present invention, since the board is formed in the shape corresponding to the area of the body, the board can be accommodated in an accommodating portion of wear for a 2-wheeled vehicle, and recognizability with respect to the radar can be improved by the reflecting layer.

In a second aspect of the present invention, a surface of the reflecting layer may be formed of a material that reflects the radar wave, or coated with a material that reflects the radar wave.

According to the second aspect of the present invention, since the reflecting layer configured to reflect the radar wave is formed on a side at which radar arrives, recognizability in the radar can be improved.

In a third aspect of the present invention, the board may include a shock absorbing layer formed of a honeycomb structure in a shock absorbing material; and a pair of elastic layers formed of an elastic member having a cavity and provided to sandwich the shock absorbing layer, and the reflecting layer may be provided between the pair of elastic layers.

According to the third aspect of the present invention, since the shock absorbing layer is formed in the honeycomb structure, the honeycomb structure is crushed to absorb a shock at the time of collision of an object, and an occupant can be protected. In addition, the cavity is provided in the boards provided on both surfaces of the shock absorbing layer, and thus air permeability in the wear can be secured.

In a fourth aspect of the present invention, the reflecting layer may be formed of an elastic member, and may deform according to a state of attachment to the body and have a surface that reflects the radar wave in the deformed state.

According to the fourth aspect of the present invention, since the reflecting layer is elastically deformed, it conforms to the shape of the body of the occupant upon mounting, the radar wave can be reflected in the deformed surface, and recognizability with respect to the radar can be improved.

In a fifth aspect of the present invention, the reflecting layer may have a plurality of triangular pyramidal shapes that are continuously formed, and retro-reflect the radar wave.

According to the fifth aspect of the present invention, since each triangular pyramidal shape is a corner reflector, the reflected wave can be retro-reflected with respect to the arrival direction of the radar wave, and recognizability of the radar can be remarkably improved.

In a sixth aspect of the present invention, in a wear in which a plurality of accommodating portions that accommodate a plurality of protectors configured to protect each area of the body are provided, the radar reflector may be formed to correspond to a shape of each of the protectors.

According to the sixth aspect of the present invention, the radar reflector can be applied as the protector of the wear, and recognizability with respect to the radar can be improved.

In a seventh aspect of the present invention, a plurality of layers having the board and the reflecting layer may be formed, and a wall configured to reflect the radar wave may be formed on an end surface of each of the layers.

According to the seventh aspect of the present invention, since the radar wave is reflected in any one of the reflecting layer and the wall even when a posture of an upper half of the body of the occupant is changed, recognizability with respect to the radar can be improved.

A radar reflector according to an eighth aspect of the present invention includes: a board formed in a shape corresponding to a surface of a protector in order to protect an area of a body; and a reflecting layer provided on the board and configured to reflect a radar wave in an irradiation direction of the radar wave.

According to the eighth aspect of the present invention, it is possible to provide the reflecting material formed to correspond to the shape of the protector and capable of being mounted on the surface of the protector of the existing wear.

A protector according to a ninth aspect of the present invention includes: a board formed of an elastic member in a 3-dimensional shape corresponding to an area of a body;

and a reflecting layer provided on the board and configured to reflect a radar wave in an irradiation direction of the radar wave.

According to the ninth aspect, the reflecting layer is formed on the surface, and thereby, it is possible to provide the protector having improved recognizability with respect to the radar and apply it to the existing wear.

A wear according to a tenth aspect of the present invention includes: a radar reflector including a board formed in a shape corresponding to an area of a body and a reflecting layer provided on the board and configured to reflect a radar wave in an irradiation direction of the radar wave; and a plurality of accommodating portions each provided at a position corresponding to each area of the body and configured to accommodate the radar reflector.

According to the tenth aspect, as the reflecting layer is formed on the surface, it is possible to provide the wear including the protector having improved recognizability with respect to the radar.

According to the aspect of the present invention, easy recognition by an in-vehicle radar of a vehicle having a driving assistance function is made possible.

DESCRIPTION OF EMBODIMENTS

Figure 1:
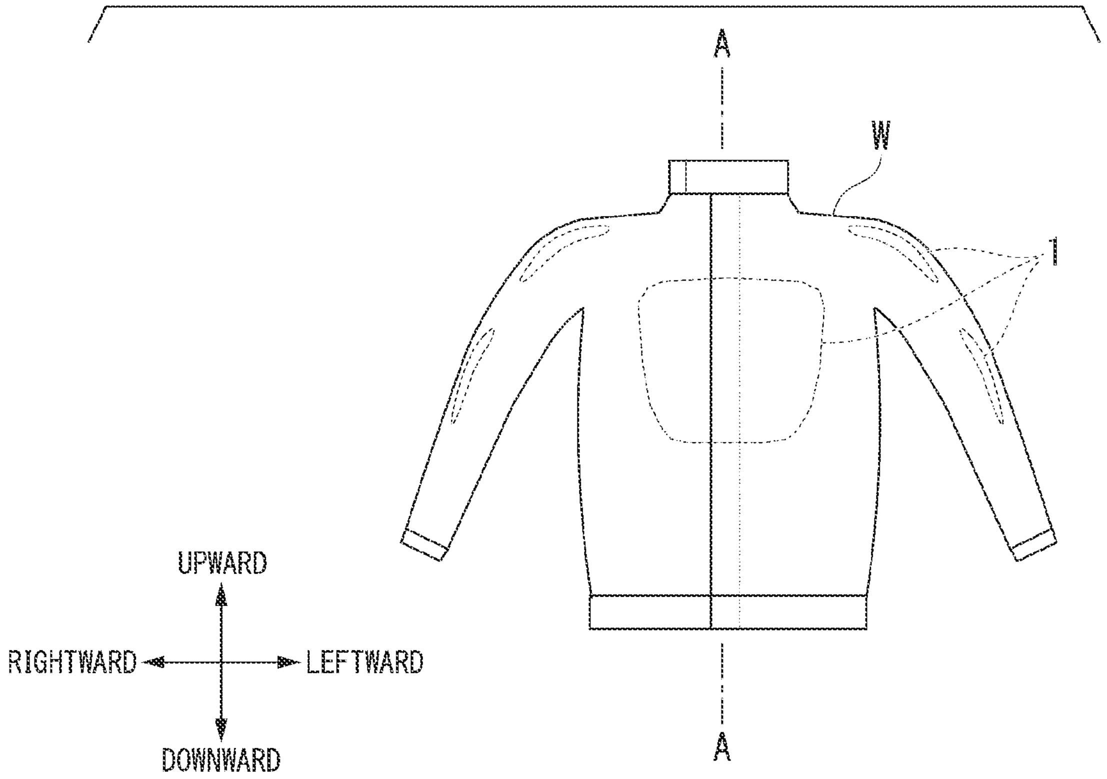
FIG. 1 is a front view showing a configuration of wear to which a radar reflector according to an embodiment is applied.
Figure 2:
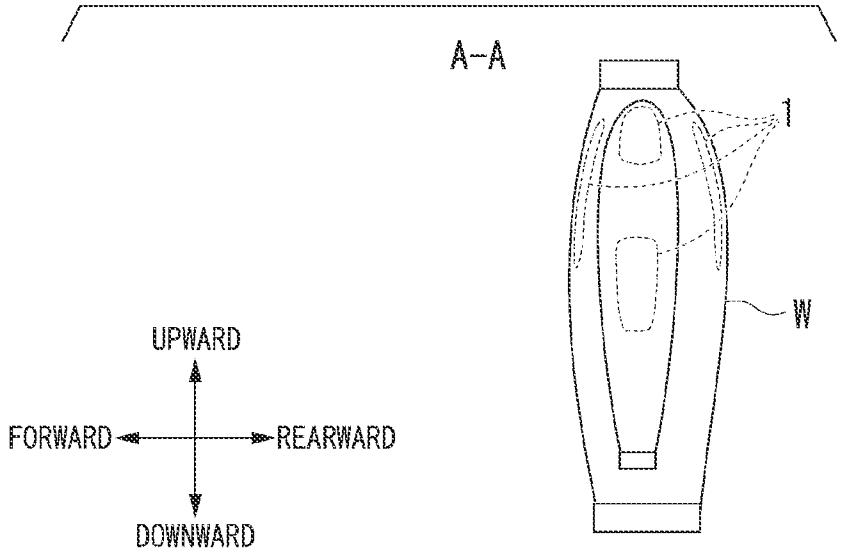
FIG. 2 is a side view showing the configuration of the wear.

As shown in FIG. 1 and FIG. 2, a radar reflector 1 is attached to, for example, wear W for an occupant in an automated 2-wheeled vehicle. For example, a plurality of accommodating portions that accommodates a plurality of protectors configured to protect areas of the body are provided in the wear W. The protectors each protect at least the chest, the back, the elbows, the knees, the shoulders, and the like. The radar reflector 1 is formed to correspond to, for example, a shape of each protector. The radar reflector 1 is formed integrally as, for example, the protector. The radar reflector 1 may be formed separately from the protector, or may be additionally accommodated in an accommodating portion of the wear W in which the protector is already accommodated. That is, the radar reflector 1 may be provided as a retrofit part in a shape corresponding to a surface of the protector. According to the radar reflector 1, it is possible to protect an occupant as a protector and improve windproofing and arctic capacity of the wear W.

Figure 3:
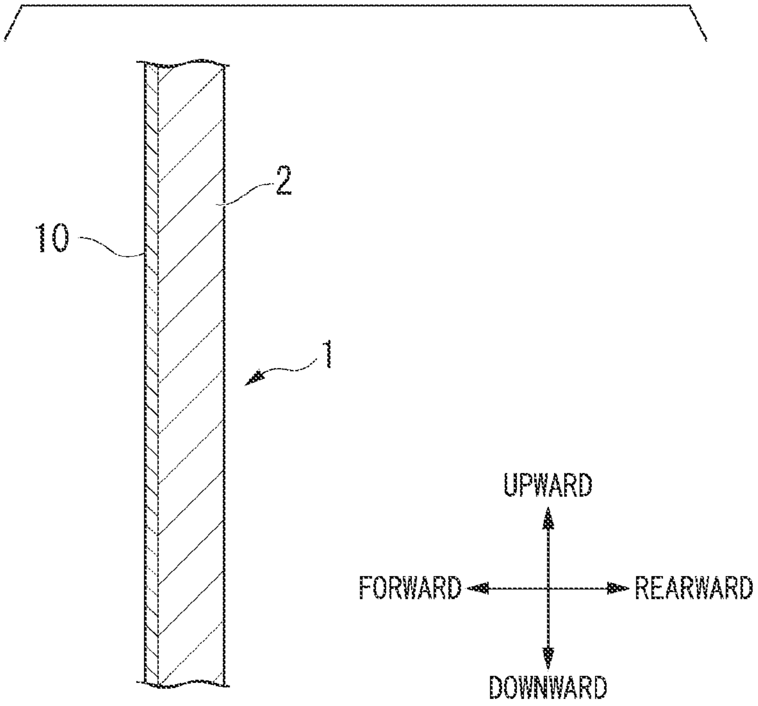
FIG. 3 is a cross-sectional view showing a configuration of the radar reflector.

FIG. 3 shows, for example, a cross section of the radar reflector 1 disposed on the chest of the wear W. The following description applies not only to the radar reflector 1 of the chest but also to the radar reflector 1 attached to another area. The radar reflector 1 is formed in, for example, a plate shape. The radar reflector 1 includes, for example, a board 2 formed in a shape corresponding to the area of the body, and a reflecting layer 10 provided on the board and configured to reflect radar waves in an irradiation direction of the radar waves. The board 2 is formed by, for example, a plate-shaped elastic member.

The board 2 is formed of, for example, an element having cushioning properties such as foam rubber, foam urethane, or the like. The board 2 is attached to, for example, the wear W, formed to conform to a shape of a user's body when worn by the user, and further, deformed according to movement of the user's body.

The board 2 may be formed in a 3-dimensional shape corresponding to a shape of an area of the body, for example, the chest, the back, the elbows, the knees, the shoulders, or the like. A thickness of the board 2 is not constant and may be appropriately changed according to a shape of the area of the body. The board 2 may be formed on a 3-dimensional protector, a shape and a thickness of which are adjusted in advance according to the shape of the area of the body, for example, the chest, the back, the elbows, the knees, the shoulders, or the like. Further, the board 2 may retain its shape when there is little contact with the body. For example, the board 2 may be not only the one accommodated in the wear W but also a patch formed in an arbitrary shape attached to an arbitrary position on the surface of or inside the wear W.

The reflecting layer 10 is formed on a surface of the board 2 on the side at which radar waves arrive. The reflecting layer 10 is formed of a material that has low transmittance of, for example, radar waves and easily reflects radar waves. The reflecting layer 10 is formed of, for example, a metal plate such as an aluminum plate or the like, or a metal thin film such as an aluminum foil or the like. Alternatively, the reflecting layer 10 may be formed by being coated with a material that reflects radar waves on the surface of the board 2. The reflecting layer 10 may have a coating layer of a metal formed through, for example, aluminum deposition or the like. The reflecting layer 10 may be configured by forming a metal layer on a surface of a sheet body formed by an elastic member.

The reflecting layer 10 is formed to deform according to deformation of the board 2, and further, to deform according to movement of the user's body. The reflecting layer 10 may be embossed in advance or formed in a wave shape to expand/contract and deform according to the deformation of the board 2. The reflecting layer 10 may be formed with a cut or the like in advance to be deformed according to the deformation of the board 2.

According to the above-mentioned radar reflector 1, when attached to the areas of the chest and the back of the wear W, since the arriving radar waves are reflected in front of and behind the occupant, recognizability of the occupant to the radar can be improved. According to the radar reflector 1, when attached to areas of the elbows, knees, and shoulders of the wear W, the radar waves arriving in a direction substantially perpendicular to a direction of advance of an occupant can be reflected, and recognizability by the radar can be improved.

The radar reflector 1 may be provided as the protector including the board 2 formed in a 3-dimensional shape corresponding to the area of the body by the elastic member, and the reflecting layer 10 provided on the board 2 and configured to reflect radar waves in an irradiation direction of radar waves R.

The radar reflector 1 may be provided as the wear W formed in a shape corresponding to the area of the body and accommodated in each of a plurality of accommodating portions provided at a position corresponding to each area of the body.

Hereinafter, variants of the radar reflector 1 will be described. In the following description, the same components as the embodiment are designated by the same names and reference signs, and overlapping description may be omitted appropriately.

Variant 1

Figure 4:
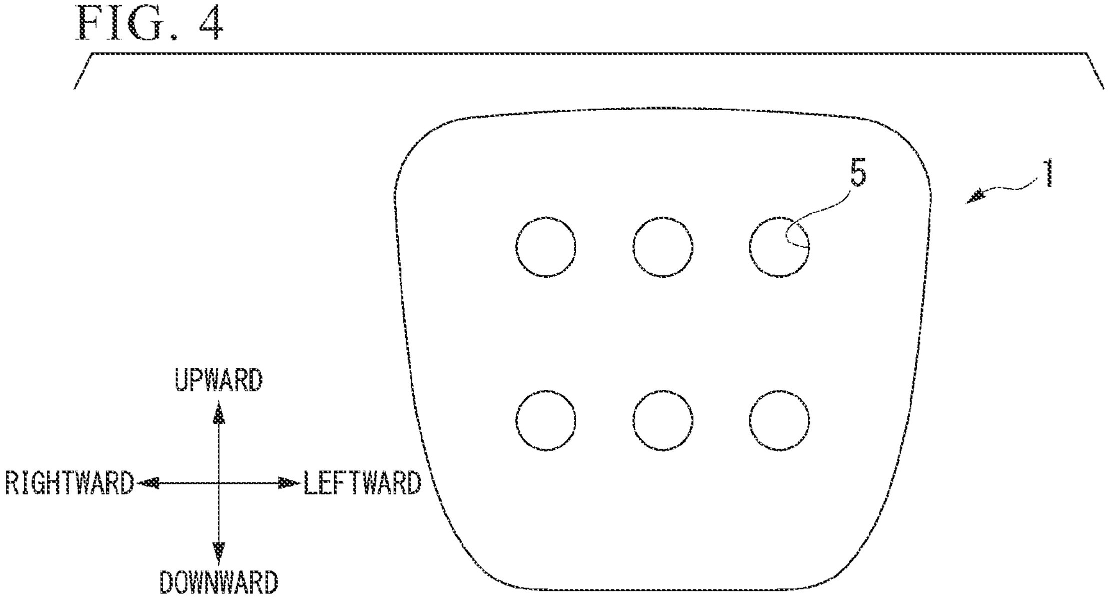
FIG. 4 is a front view showing a configuration of a radar reflector according to Variant 1.

FIG. 4 shows, for example, a state in which the radar reflector 1 disposed on the chest of the wear W is seen in a front view. The following description is applied not only to the radar reflector 1 of the chest but also to the radar reflector 1 attached to another area.

Figure 5:
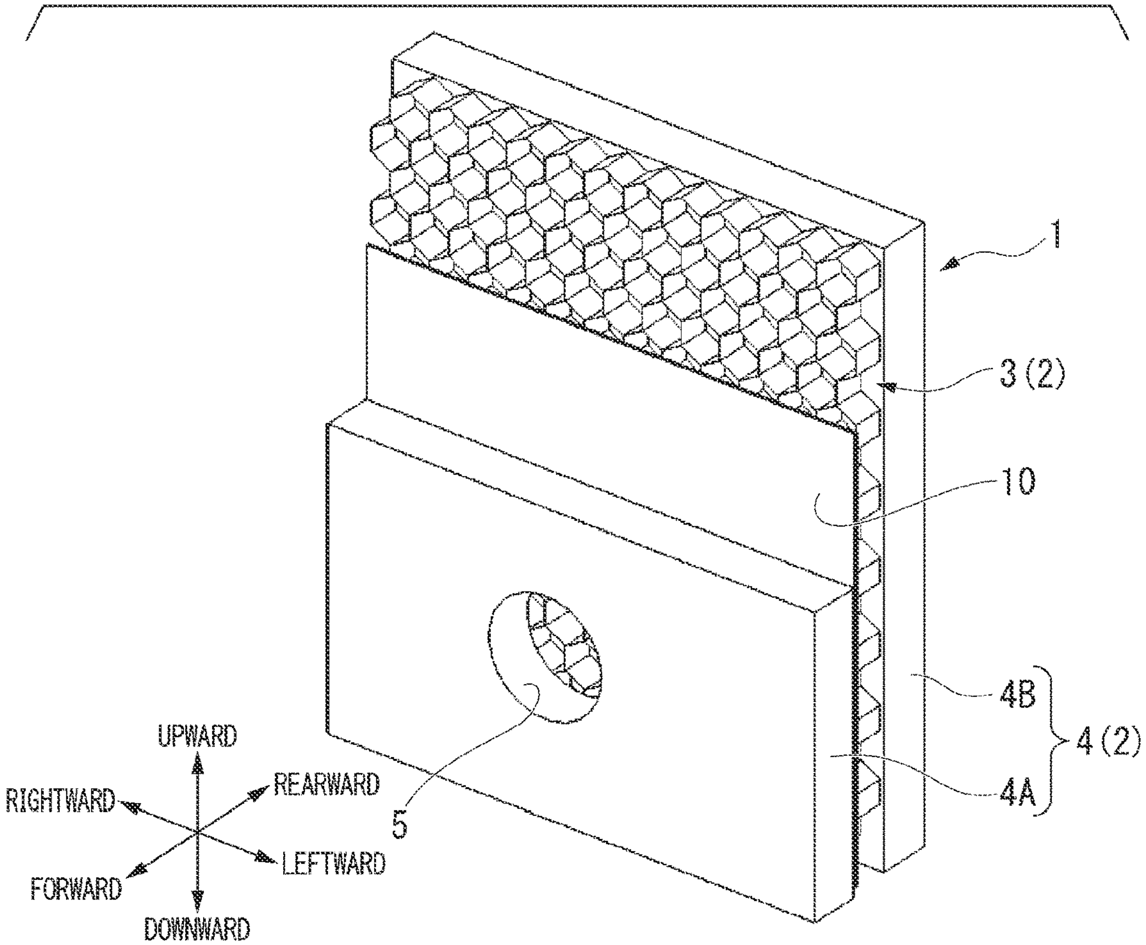
FIG. 5 is an exploded perspective view showing the configuration of the radar reflector according to Variant 1.

As shown in FIG. 5, in the radar reflector 1, the board 2 has a shock absorbing layer 3 formed of a shock absorbing material, and a pair of elastic layers 4 provided to sandwich the shock absorbing layer 3.

The shock absorbing layer 3 is formed in, for example, a honeycomb structure. The honeycomb structure is formed by continuously disposing innumerable tubular shapes having polygonal cross sections without gaps. The shock absorbing layer 3 is formed in, for example, a plate-shaped honeycomb structure in which hexagonal shapes are continuous. The shock absorbing layer 3 may be a structure in which triangular shapes and quadrangular shapes are continuous. The shock absorbing layer 3 is formed of, for example, a resin, paper, a metal foil, or the like. The shock absorbing layer 3 is formed of a shock absorbing material crushed and deformed when an external force such as an impact force or the like is received.

The elastic layer 4 is formed of, for example, a plate-shaped elastic member. The elastic layer 4 is formed of, for example, a light element having cushioning properties such as foam rubber, foam urethane, or the like. The elastic layers 4 have, for example, cavities 5 formed as circular through-holes. The cavities 5 are provided at, for example, positions corresponding to the pair of elastic layers 4, respectively. The cavities 5 are used for ventilation between air in the wear W and outside air. For example, a part of the reflecting layer 10 is exposed in the cavities 5 of the elastic layers 4 disposed on the side of the arrival direction of the radar waves. A region of the reflecting layer 10 corresponding to the cavities 5 may be open, or may have a plurality of micro holes for securing air permeability.

The reflecting layer 10 is provided between the pair of elastic layers 4. In the pair of elastic layers 4, a first elastic layer 4A is disposed on a side in front of the user's body, and a second elastic layer 4B is disposed on the side of the user's body. The reflecting layer 10 may be configured by forming a metal layer on the surface of the sheet body formed of an elastic member or may be formed by coating on the other surface side of the second elastic layer 4B. That is, the reflecting layer 10 may be formed of an elastic member. In addition, the reflecting layer 10 may be formed between the shock absorbing layers 3.

One surface side of the first elastic layer 4A is the front side when seen from the user, and the side at which radar waves arrive. The other surface side of the first elastic layer 4A faces the shock absorbing layer 3. The reflecting layer 10 is provided on the other surface side of the first elastic layer 4A. The reflecting layer 10 may be provided on one surface side of the first elastic layer 4A. Openings are formed in the reflecting layer 10 at positions corresponding to the cavities 5. The reflecting layer 10 faces the second elastic layer 4B via the shock absorbing layer 3.

The second elastic layer 4B is disposed on the side of the user's body. For example, cavities (not shown) are formed in the second elastic layer 4B to correspond to the positions of the cavities 5 of the first elastic layer 4A. The second elastic layer 4B has the same configuration as the first elastic layer 4A. The first elastic layer 4A may be formed thinner than the second elastic layer 4B in order to improve transmittance of the radar waves R. The thickness of the first elastic layer 4A and the second elastic layer 4B may be adjusted according to the area of the body of the attachment target. The first elastic layer 4A may be integrated with the reflecting layer 10. According to the above-mentioned configuration, the radar reflector 1 deforms according to a state attached to the user's body, and a surface that reflects radar waves is formed on the reflecting layer 10 in the deformed state. The first elastic layer 4A may not be necessarily provided in the radar reflector 1. In the case of the configuration, radar waves can be directly reflected to the reflecting layer 10 by disposing the reflecting layer 10 in the arrival direction of the radar waves.

Figure 6:
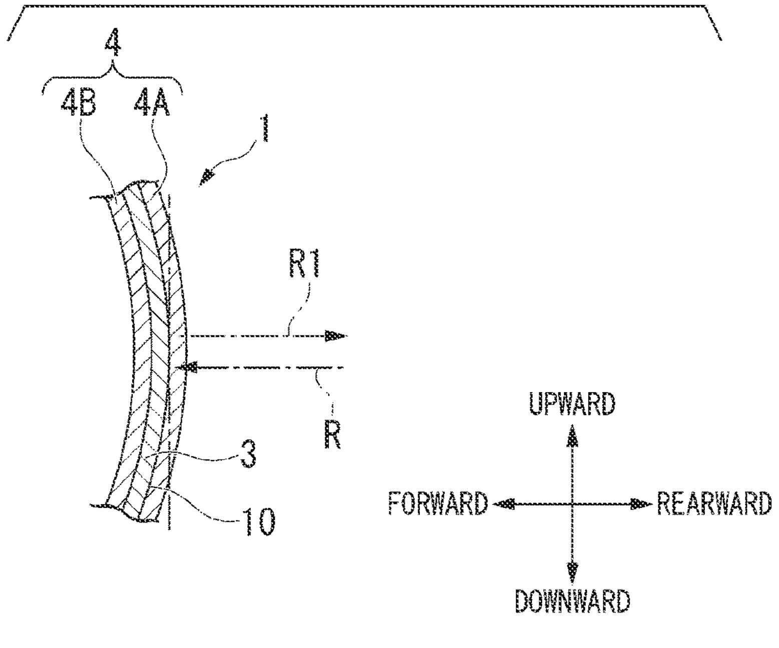
FIG. 6 is a cross-sectional view showing a function of the radar reflector according to Variant 1.

As shown in FIG. 6, for example, the radar reflector 1 on the back side elastically deforms and curves according to the shape of the user's body. When the radar waves R arrive at the back side, in a part of the curved reflecting layer 10, since the surface that reflects radar waves is formed, the radar waves R passing through the first elastic layer 4A can be reflected in a part of the reflecting layer 10, and reflected waves R1 can be reflected with respect to the arrival direction of the radar waves R.

Variant 2

Figure 7:
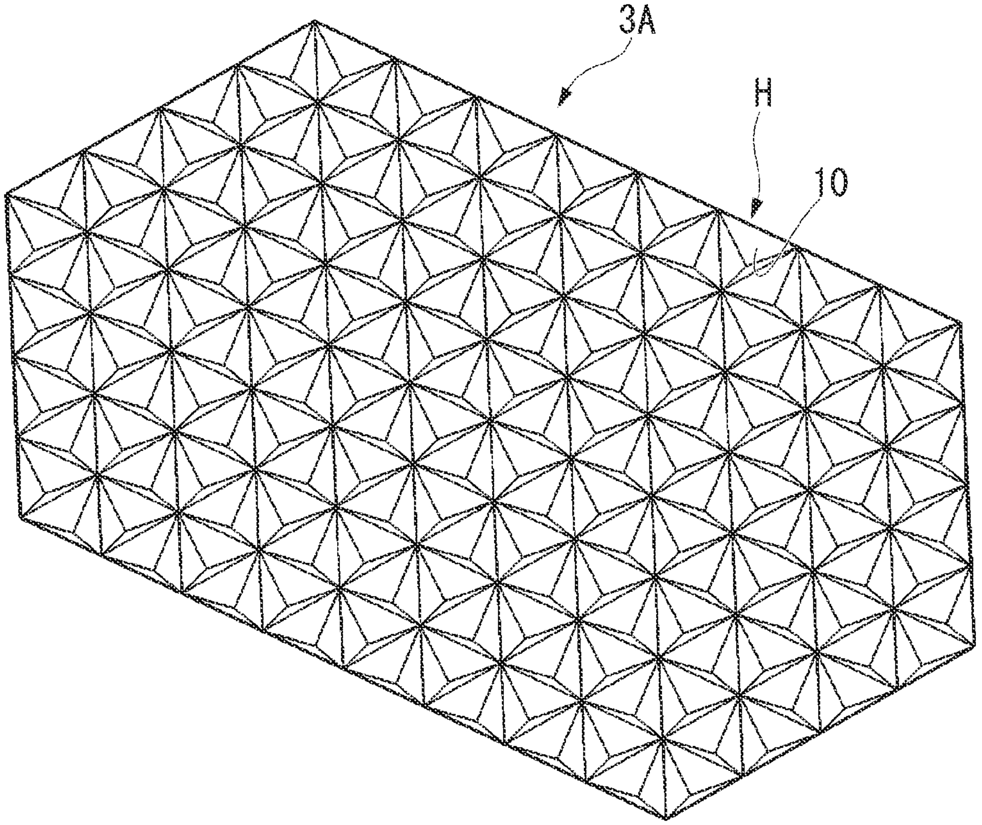
FIG. 7 is a perspective view showing a configuration of a shock absorbing layer according to Variant 2.

As shown in FIG. 7, a honeycomb structure of the shock absorbing layer 3A in the board 2 may be formed in a retro-reflecting shape that reflects reflected waves with respect to the arrival direction of the radar waves. The retro-reflecting shape is constituted by arranging reflecting elements H formed by innumerable triangular pyramidal depressions with no gap. The reflecting layer 10 is formed on the surface of the shock absorbing layer 3 on the arrival side of the radar waves by coating or the like. Accordingly, the reflecting layer 10 has a plurality of triangular pyramidal shapes that are continuously formed, and retro-reflects radar waves.

Figure 8:
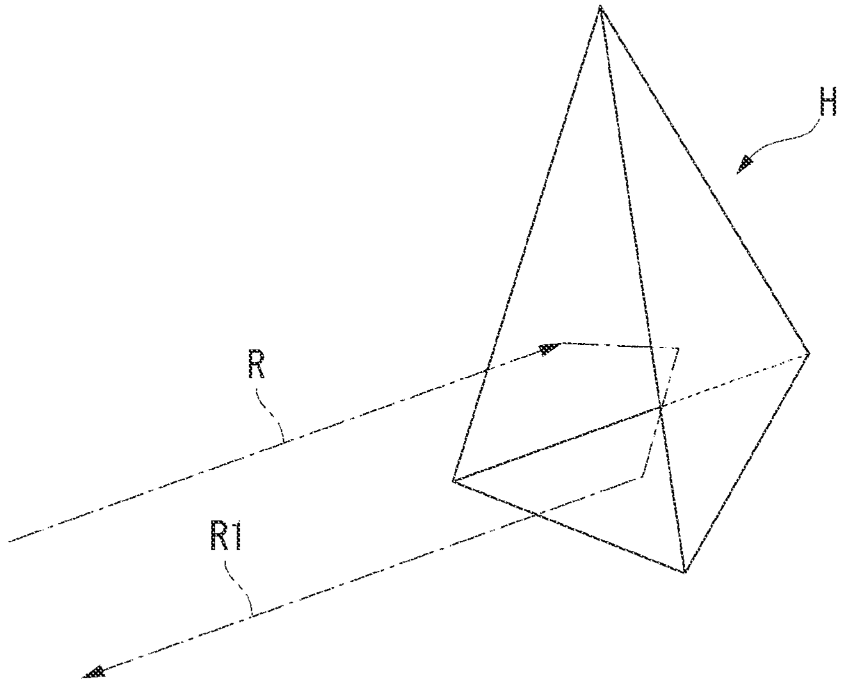
FIG. 8 is a perspective view showing a function of a reflecting element that constitutes a shock absorbing layer according to Variant 2.

As shown in FIG. 8, the reflecting element H is formed by combining three right-angled isosceles triangular shapes. The reflecting element H has right-angled corners, and surfaces facing the corners are open in a regular triangular shape. The reflecting layer 10 is formed on the surface of the reflecting element H on the recessed side. The shape of the reflecting element H is referred to as a corner reflector, and in an optical field, is known as a structure having a property of reflecting reflected light with respect to an incidence direction of light waves as a retro-reflecting material. The reflecting element H retro-reflects the reflected waves R1 in the arrival direction of the radar waves R because the reflecting layer 10 is formed on the surface.

Figure 9:
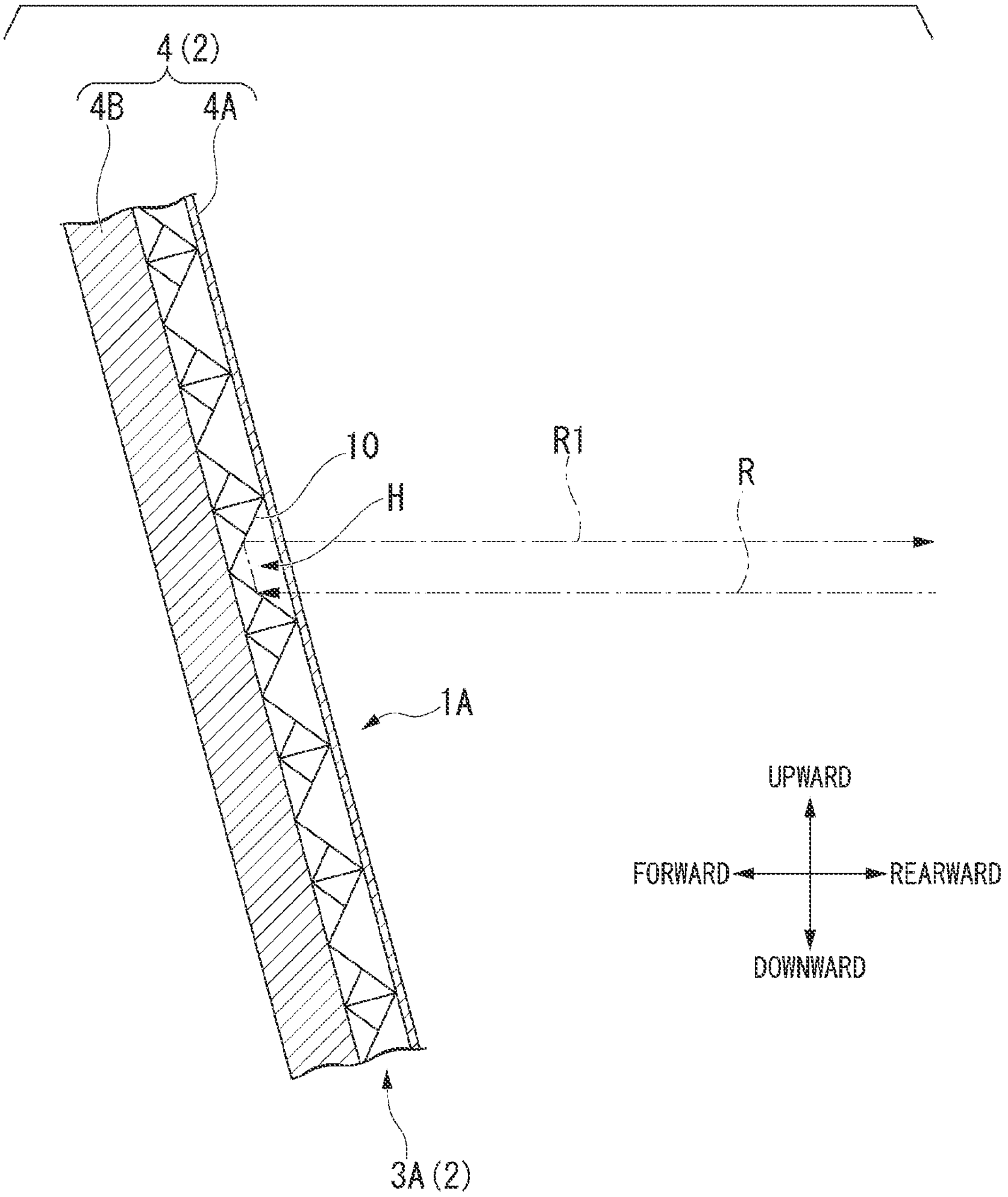
FIG. 9 is a cross-sectional view showing a configuration of a radar reflector according to Variant 2.

FIG. 9 shows, for example, the radar reflector 1A disposed on the back side of the user. In the radar reflector 1A, the pair of boards 2 are provided on one surface side and the other surface side of the shock absorbing layer 3A. According to the radar reflector 1A, regardless of an installation angle of the radar reflector 1A with respect to the arrival direction of the radar waves R, the reflected waves R1 can be retro-reflected with respect to the arrival direction of the radar waves R.

Variant 3

Figure 10:
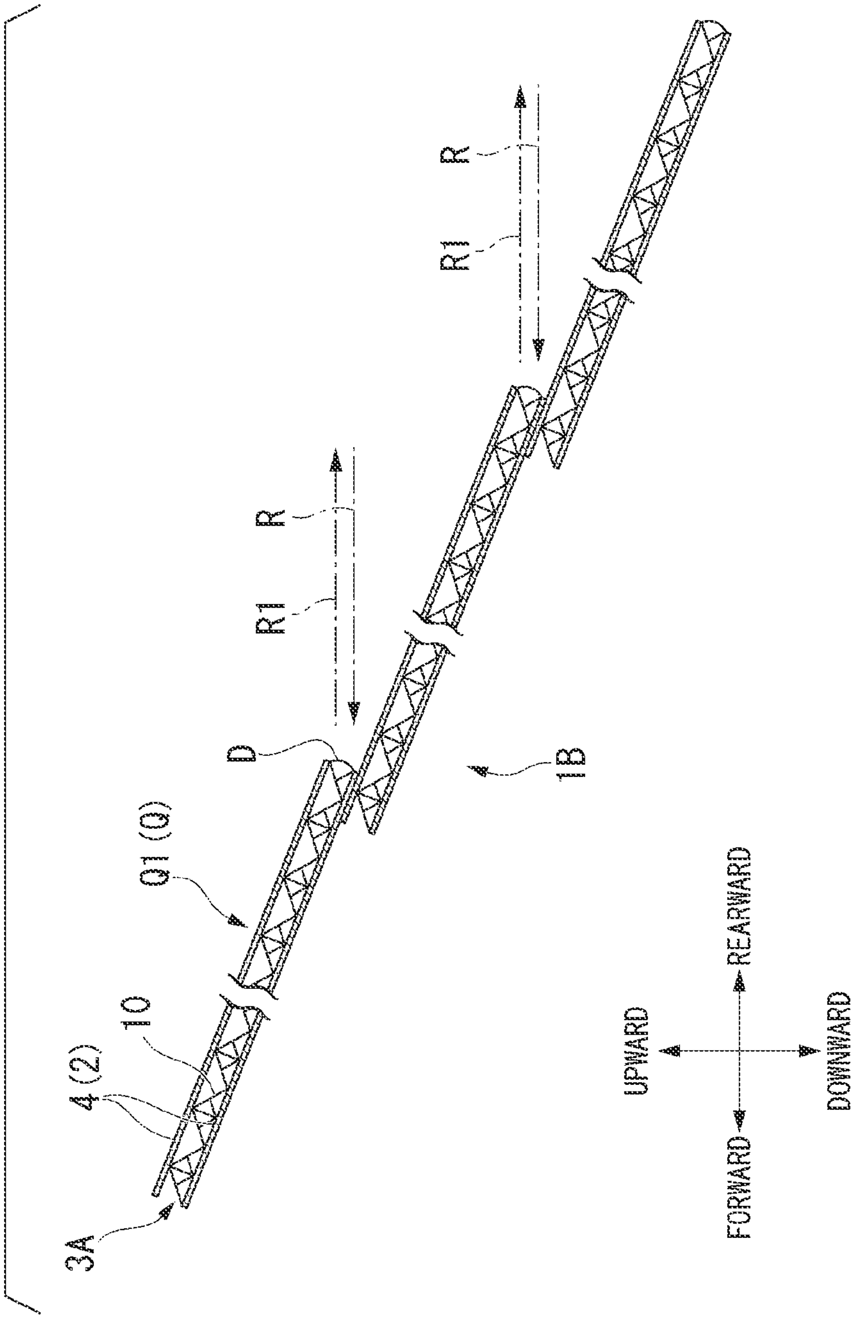
FIG. 10 is a cross-sectional view showing a configuration of a radar reflector according to Variant 3.

As shown in FIG. 10, in a radar reflector 1B according to Variant 3, the boards 2 and the reflecting layers 10 are alternately formed on a plurality of layers Q. Each layer Q1 has, for example, the shock absorbing layer 3A, the reflecting layer 10 formed on the surface of the shock absorbing layer 3A, and the boards 2 provided on both surfaces of the shock absorbing layer 3A. The layers Q1 partially overlap as two layers, and are stacked in a staircase pattern to form the plurality of layers Q. A wall D configured to reflect radar waves is formed on an end surface of each layer Q1. The wall D is formed of, for example, the same material as the reflecting layer 10. The wall D may be formed by arranging the reflecting element H of the shock absorbing layer 3A along the end surface of each layer Q1.

The radar reflector 1B is attached to, for example, the back portion of the wear W. In the radar reflector 1B, for example, when a posture of an upper half body of a user who rides on a saddle riding type two-wheeled vehicle such as a scooter or the like is close to vertical, the reflected waves R1 of the radar waves R are retro-reflected with respect to the arrival direction of the radar waves R by the reflecting layer 10 formed on the surface of the shock absorbing layer 3A (see FIG. 9).

In the radar reflector 1B, for example, when a posture of an upper half body of a user who rides on a saddle riding two-wheeled vehicle such as a sports type or the like is close to horizontal, the reflected waves R1 of the radar waves R are retro-reflected with respect to the arrival direction of the radar waves R by the reflecting layer 10 formed on the wall D of the shock absorbing layer 3A. According to the radar reflector 1B, the reflected waves R1 of the radar waves R are retro-reflected with respect to the arrival direction of the radar waves R even when the user's posture is changed, and reflectivity can be improved.

As described above, according to the radar reflector of the embodiment, since the radar waves are easily reflected, recognizability can be improved in radar exploration used by the driving assistance vehicle. According to the radar reflector, it can be used as the protector by the shock absorbing layer and the electrically deforming board. According to the radar reflector, the reflected waves can be retro-reflected with respect to the arrival direction of the radar waves, and recognizability of the radar can be improved.

In addition, it is possible to replace the components in the above-mentioned embodiment with known components as appropriate without departing from the scope of the present invention, and the above-mentioned variants may be combined as appropriate. For example, the radar reflector may be applied to not only the wear of the occupant on the vehicle, but also articles that are difficult to reflect radar waves, such as helmets, pedestrian clothing, work jackets, pedestrian-carrying bags, umbrellas, canes, strollers, shopping carts, wheelbarrows, and the like. The radar reflector 1 is provided in the form of a plate-shaped body, and the user may cut it into an arbitrary shape and attach it to an arbitrary subject for use.

What is claimed is:

1. A radar reflector comprising:
a board formed in a shape corresponding to an area of a body; and
a reflecting layer provided on the board and configured to reflect a radar wave in an irradiation direction of the radar wave,
wherein the board comprises:
a shock absorbing layer formed in a shock absorbing material; and
a pair of elastic layers formed of an elastic member having a cavity and provided to sandwich the shock absorbing layer, and
wherein the reflecting layer is provided between the pair of elastic layers.

2. The radar reflector according to claim 1,
wherein a surface of the reflecting layer is formed of a material that reflects the radar wave, or coated with a material that reflects the radar wave.

3. The radar reflector according to claim 1,
wherein the reflecting layer is formed of an elastic member, deforms according to a state of attachment to the body, and has a surface that reflects the radar wave in the deformed state.

4. The radar reflector according to claim 1,
wherein the reflecting layer has a plurality of triangular pyramidal shapes that are continuously formed, and retro-reflects the radar wave.

5. The radar reflector according to claim 1,
wherein, in a wear in which a plurality of accommodating portions that accommodate a plurality of protectors configured to protect each area of the body are provided, the radar reflector is formed to correspond to a shape of each of the protectors.

6. The radar reflector according to claim 1,
wherein a plurality of layers having the board and the reflecting layer are formed, and
a wall configured to reflect the radar wave is formed on an end surface of each of the layers.

7. A wear in which an accommodating portion that accommodates a protector configured to protect an area of a body is provided,
wherein the radar reflector according to claim 1 is formed to correspond to a shape of the protector and is accommodated in the accommodating portion.

* * * * *